United States Patent [19]

Semon et al.

[11] 3,863,234

[45] Jan. 28, 1975

[54] FAST BUBBLE LOGIC GATES

[75] Inventors: Warren L. Semon, De Witt; Luther D. Rudolph, Manlius, both of N.Y.

[73] Assignee: Monsanto Company, St. Louis, Mo.

[22] Filed: Feb. 23, 1973

[21] Appl. No.: 335,296

[52] U.S. Cl... 340/174 TF, 340/174 SR, 307/88 LC

[51] Int. Cl. ............................................ G11c 11/14

[58] Field of Search ............................... 340/174 TF

[56] References Cited

UNITED STATES PATENTS 3,735,145 5/1973 Heinz ........................... 340/174 TF

*Primary Examiner*—James W. Moffitt
*Attorney, Agent, or Firm*—Lane, Aitken, Dunner & Ziems

[57] ABSTRACT

A pair of spaced linear magnetic boundaries form an instantaneous transmission channel or bubble wire in which a string of bubbles is normally constrained such that a magnetic impulse at one end of the channel is transmitted by bubble-bubble interaction along the string, resulting in the ejection of a magnetic bubble at the other end of the channel. An instantaneous bubble logic circuit is formed by providing a break at one point in the magnetic boundary of the channel with means for reconstituting or completing the boundary at that point on comamnd. If the boundary is broken when an impulse is applied to one end of the bubble string, the bubble nearest the break will escape from the string through the broken boundary and no output bubble will be ejected because the chain reaction will stop at the location of the break. If the bubble wire is reconstituted, an output bubble will be ejected as in the normal case when the magnetic impulse is applied. Multi-input AND gates can be implemented by providing controlled discontinuities at a number of positions along the magnetic boundaries of the same bubble wire. One or more breaks in the boundary cause removal of one bubble from the string through the break nearest the end to which an impulse is applied. If the impulse is an input bubble, it will either supplement the string of bubbles if one escapes, or cause an output bubble to be ejected.

16 Claims, 6 Drawing Figures

FAST BUBBLE LOGIC GATES

BACKGROUND OF THE INVENTION

The invention relates generally to the field of magnetic bubble technology (MBT) and more particularly to logic arrangements utilizing the capabilities of single wall magnetic domain devices.

The continuing evolution of MBT has now reached the point where large scale application to various data processing tasks is practicable. Current interest in MBT is due primarily to the prospect of extremely high bit packing density, low power consumption and reliability for low cost mass memories.

Briefly, MBT involves the creation and propagation of magnetic bubbles in specially prepared magnetic materials. The word "bubble" used throughout this text is intended to encompass any single-walled magnetic domain, defined as a domain having outer boundary which closes on itself. The application of a static uniform magnetic bias field orthogonal to a sheet of magnetic material having suitable uniaxial anisotropy causes the normally random serpentine pattern of magnetic domains to shrink into short cylindrical configurations or bubbles whose common polarity is opposite that of the bias field. The bubbles repel each other and can be moved or propagated by a magnetic field in the plane of the sheet.

Many schemes now exist for propagating the bubbles in predetermined channels. One propagation system includes permalloy circuit elements shaped like military service stripes or "chevrons" spaced end-to-end in a thin layer over the sheet of magnetic material. The drive field is continuously rotating in the plane of the sheet causing each chevron to act as a small magnet whose poles are constantly changing. As the drive field rotates, a bubble under one of the chevrons is moved along the chevron channel from point to point in accordance with its magnetic attraction to the nearest attracting temporary pole of a circuit element. This system is among those referred to as "field-accessed" as distinguished from other systems employing sequentially pulsed series of loops of electrical conductors disposed over the magnetic sheet.

The use of MBT in data processing stems from the fact that bubbles can be propagated through their channels at a precisely determined rate so that uniform data streams of bubbles are possible in which the presence or absence of a bubble indicates a binary 1 or 0. The use of MBT for performing logic operations is based on the characteristic that close magnetic bubbles tend to repel each other. Thus, if alternate paths with varying degrees of preference are built into the chevron circuit, the direction in which a bubble on one channel ultimately takes may be influenced by the presence or absence of a bubble on another closely spaced channel. Logic systems capitalizing on this principle are shown in an article by Minnick et al entitled "Magnetic Bubble Logic" published in the Proceedings of the Wescon Conference, September 1972, and in a corresponding patent application, Ser. No. 283,267 filed Aug. 24, 1972 by Minnick et al., entitled "Magnetic Bubble Logic Family."

One of the seemingly inherent deficiencies of magnetic bubble logic circuits, as well as the basic propagation systems, is the relatively slow speed at which the bubbles move in comparison to electrical signals in wires. Some success has already been achieved in increasing the speed of propagation circuits. In an article by Bonyhard et al. entitled "Application of Bubble Devices" in IEEE Transactions on Magnetics, vol. MAG-6, No. 3, September 1970, a "compressor" circuit is disclosed utilizing a chain of idler circuits constructed of bar-shaped circuit elements. The operation of the compressor is based on interaction between the bubbles in adjacent idlers. When a bubble is presented at the input of the chain, a chain reaction takes place along the whole compressor. Bubbles in all the idlers move in the direction of the output resulting in the spill-over of the last bubble within one cycle of rotation. The absence of an input bubble leaves the content of the compressor unchanged. Thus, using the compressor, information can be transmitted over a much larger distance in one cycle than it would be possible using T-bar or chevrons along.

In the copending application Ser. No. 335,303, filed Feb. 23, 1973, by Robert C. Minnick, Paul T. Bailey and Robert M. Sandfort entitled "Magnetic Bubble Transmission Circuits" another compressor-type circuit, called a "bubble wire," is disclosed. A pair of spaced, linear magnetic boundaries define a channel in which a plurality of adjacent bubbles are constrained in a string such that a magnetic impulse at one end of the channel causes the ejection of a bubble from the other end of the channel in a manner similar to the effect of striking a line of contiguous pool balls head on with a cue ball.

SUMMARY OF THE INVENTION

The general purpose of the invention is to increase the speed at which logical operations can be performed using magnetic bubbles.

The applicants have discovered a way in which the bubble wire transmission circuit disclosed in the copending application can be modified to perform logical operations instantaneously. If the bubble wire is "broken" at one point, the discontinuity in the magnetic boundary at that point provides an escape route for bubbles contained in the bubble wire. Thus, when a magnetic impulse is applied at one end to a string of closely spaced bubbles confined in the bubble wire, the bubble immediately upstream of the opening of the boundary wall will choose the path of least resistance and exit the bubble wire at the point of the discontinuity or break. As a result, a bubble will not be expelled from the opposite end of the bubble wire, in contrast to the normal operation in which a magnetic impulse at one end causes immediate expulsion of a bubble at the other end. The discontinuity in the magnetic boundary can be controlled so that the break can be sealed temporarily. When the break in the boundary is sealed the bubble wire performs normally and an impulse at one end causes the expulsion of the bubble at the opposite end.

A number of controlled discontinuities can be formed along the length of the same bubble wire. If any of these discontinuities are not temporarily sealed when a magnetic impulse occurs at the one end of the bubble wire, there will be no output. Instead, the chain reaction among the bubbles will stop at the nearest discontinuity, where the last bubble in the chain reaction will be removed from the bubble wire through the opening in the boundary wall.

In the preferred embodiment the bubble wire is formed by two parallel lines of equally spaced and aligned dots of ferro-magnetic material having low magnetic reluctance with the low retentivity, such as permalloy, around which respective "fence" bubbles form. A string of bubbles is contained between the bubble fences. The bubbles seek energy minima and therefore tend to reside in stable positions between corresponding fence post positions. At several spaced locations along one of the bubble fences, the permalloy dot or fence post is omitted. These positions are called "special fence positions." Corresponding external V-shaped bubble propagation tracks intersect the special fence positions. The input of each external bubble track is a bubble variable $X_i$ where $i$ is an integer between 1 and $m$. At the special fence position where the external propagation track encounters the bubble wire, the external track turns sharply away from the wire and leads to a bubble annihilator. If all $X_i$ are 1, representing the presence of a bubble, and the $X_i$ bubbles are suitably phased, the $X_i$ bubbles will advance to the special fence position at exactly the same time that a magnetic impulse, such as another input bubble, is introduced at the input end of the entire bubble wire. Because the $X_i$ bubbles reside in the special fence positions at this moment, the boundary of the bubble wire is completed, and an output bubble will be expelled from the opposite end of the bubble wire. However, if one or more of the $X_i$ bubbles is missing from a corresponding special fence position, the bubble by the vacant special fence position nearest the end to which the input bubble is applied will be forced to move into the fence position and thus onto the corresponding external propagation channel, on which it is ultimately led to annihilation. In this case, the input bubble merely supplements the string of bubbles. Accordingly, the output of the bubble wire is a logic function represented by the expression, $f = X_1X_2 \ldots X_m$, that is, an $m$-input AND gate.

DESCRIPTION OF THE PREFERRED EMBODIMENTS

Figure 1:
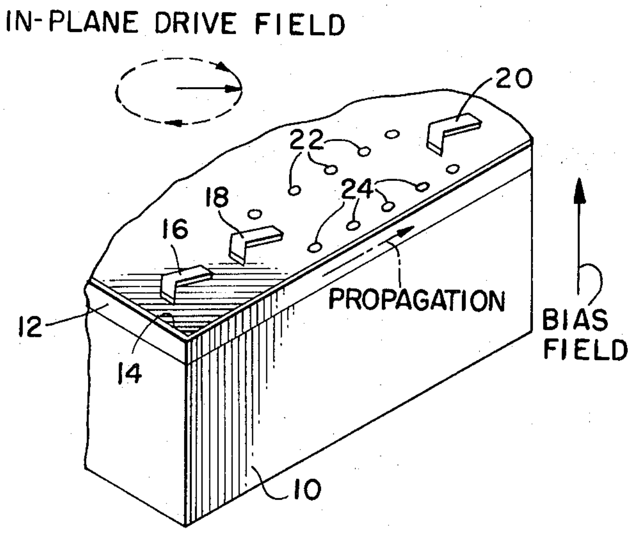
FIG. 1 is a fragmentary perspective view of a magnetic bubble chip having a bubble wire circuit.

FIG. 1 illustrates the basic components of a field-accessed garnet bubble chip having a bubble wire circuit of the type disclosed in the above-referenced application of Robert C. Minnick, Paul T. Bailey and Robert M. Sandfort. A substrate 10 of nonmagnetic garnet supports an epitaxial magnetic bubble garnet layer 12 and a spacing layer 14 of silicon oxide, $SiO_2$, to which conventional permalloy chevron circuit elements 16, 18 and 20 are bonded. The chip is subjected to a magnetic bias field orthogonal to the plane of the bubble garnet 12. In the presence of a bias field of suitable strength, cylindrical magnetic bubbles (not shown in FIG. 1) are maintained in the bubble garnet layer 12. A rotating, in-plane magnetic drive field causes bubbles to propagate, for example, from chevron circuit element 16 to element 18. Spaced lines of equally spaced permalloy dots 22 and 24 are arranged approximately parallel to the direction of propagation between the separated chevron elements 18 and 20. The lines of dots 22 and 24 may be any desired length, the length shown in FIG. 1 being chosen for convenience of illustration only.

Figures 2, 3:
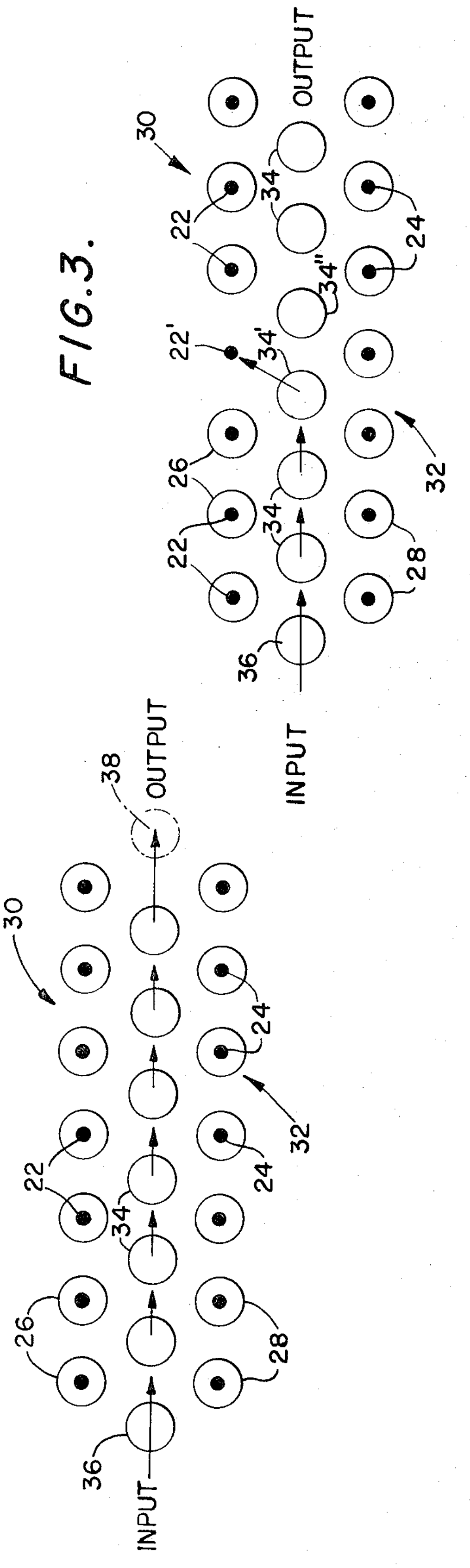
FIG. 2 is a schematic diagram of the bubble wire circuit of FIG. 1.
FIG. 3 is a schematic diagram of the bubble wire circuit of FIG. 1 in which one of the fence bubbles has been removed according to the invention.

The operation of the bubble wire transmission circuit formed by the lines of dots 22 and 24 is shown schematically in FIG. 2. Stationary magnetic bubbles 26 and 28 form about the dots 22 and 24 respectively. By analogy the permalloy dots 22 and 24 are termed "fence posts." The bubbles 26 and 28 form about the fence post dots 22 and 24 because the low reluctance of the permalloy dots serves to concentrate the bias field at these positions. The bubbles 26 and 28 act as a fence or magnetic boundary for the bubble wire. Thus, the bubbles 26 will be referred to collectively as bubble fence 30, and the bubbles 28 will be referred to collectively as bubble fence 32. When the path between the lines of bubbles 26 and 28 has filled with magnetic bubbles 34, the bubbles 34 will remain closely spaced from each other in a line between the bubble fences 30 and 32 because of the repelling similar polarity of the fences and bubbles. If the permalloy dots in the two lines are approximately aligned as shown in FIG. 2, each bubble will seek an energy minimizing, relatively stable position between adjacent corresponding fence bubble positions. Thus each bubble 34 will be substantially centered between two fence bubbles 26 and two fence bubbles 28. The rotating drive field has no effect on the bubbles 30 because there are no low reluctance circuit elements in the path between the bubble fences.

When an input bubble 36, or other magnetic impulse, is introduced at one end of the path between the bubble fences 30 and 32, the bubble-bubble interaction is transferred through the bubbles 34 as in a chain reaction. All of the bubbles 34 advance (rightward as viewed in FIG. 2) to the next stable position, resulting in the expulsion of an output bubble 38 practically instantaneously. The effect is somewhat analogous to that of a cue ball colliding head on with one end of a line of contiguous pool balls whereby only the pool ball on the opposite end is ejected from the line. With reference to FIG. 1, the input bubble 36 would come from the chevron 18 and the output bubble 38 would go to the chevron 20. Thus, in operation this circuit would perform the same as if chevrons 18 and 20 were actually adjacent like chevrons 16 and 18. Hence, the bubble wire formed by the bubble fences 30 and 32 serves to compress the distance between the chevrons 18 and 20.

If the transmission circuit shown in FIGS. 1 and 2 is considered a "whole" bubble wire, then the circuit shown in FIG. 3 may be termed a "broken" bubble wire. One of the permalloy dots, 22', lacks a fence bubble 26. The dot 22' designates a special fence position or a discontinuity in the boundary of the bubble wire. The absence of a fence bubble 26 at the special fence position means a lack of repulsive magnetic force at that point. Moreover, the concentrated field associated with the permalloy dot 22′ is an added attraction to the bubbles 34 in the bubble wire. Thus, in the circuit of FIG. 3 when an input bubble 36 is introduced, the chain reaction between the bubbles is terminated when a bubble 34′ immediately upstream of the special fence position chooses in effect to move to the special fence position instead of fighting the magnetic repulsion of the next bubble 34″. The bubble 34′ will be trapped by the permalloy dot 22′ and thereafter the bubble 34′ will behave as if it were a fence bubble 26. The bubbles immediately preceding the escaped bubble 34′ will advance one position on the bubble wire. With the addition of the input bubble to the end of the string, the wire remains completely filled with bubbles.

The broken wire circuit of FIG. 3 serves to illustrate the underlying concept which allows the bubble wire of FIG. 2 to be modified to perform logic functions. In the condition illustrated in FIG. 3, the input bubble 36 fails to produce an output from the bubble wire because there was a discontinuity in the bubble fence 30. In the next "cycle" of operation another input bubble 36 would cause the expulsion of an output bubble 38 because the bubble 34′ would have filled the vacant special fence position. Thus, the output of the bubble wire is logically related to the condition of the special fence position. If the discontinuity in the bubble fence can be externally controlled, the output of the bubble wire will be a function of a logic variable.

Figure 5:
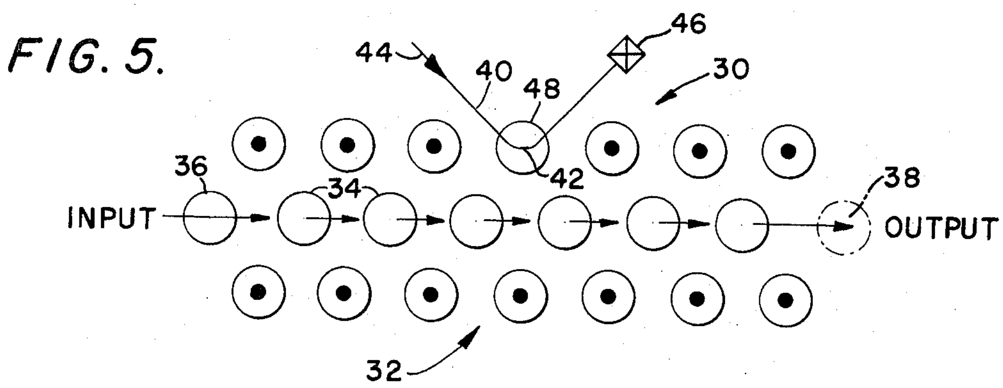
FIG. 5 is a schematic diagram illustrating the circuit of FIG. 4 when the normally vacant special fence position is supplied with a fence bubble via the external propagation channel.
Figure 4:
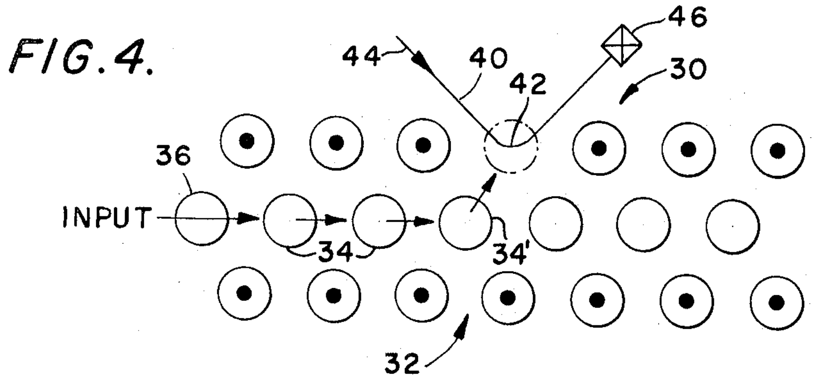
FIG. 4 is a schematic diagram of a modified bubble wire circuit with a vacant special fence position traversed by an external propagation channel according to the invention.

Means for performing such control of the discontinuity in the magnetic boundary of the bubble wire is shown in companion FIGS. 4 and 5. The circuit of FIGS. 4 and 5 is similar to the broken wire circuit of FIG. 3 except that the permalloy dot 22′ is omitted and an external V-shaped propagation circuit or track 40 intersects the special fence position 42. The propagation track 40 may be constructed of chevrons, T-bars or other suitable propagation elements, preferably field-accessed. The track 40 has an upstream input end 44, and the end of the track 40 downsteam of the special fence position 42 is terminated by a bubble annihilator or eater 46. A bubble 48 introduced on the propagation track 40 at the end 44 will advance in a regular fashion along the track 40 through the special fence position 42 and on to the annihilator 46 where the bubble will be destroyed. If a bubble 48 is introduced on the track 40 at the right time, its temporary location at the special fence position can be made to coincide with the introduction of an input bubble 36. This operation is shown in FIG. 5. Since the bubble fence 30 is completed by the bubble 48, the input bubble 36 causes the expulsion of an output bubble 38 in FIG. 5. However, in FIG. 4, the input bubble 36 occurs at a time where there is no bubble at the special fence position. As a result, the nearest bubble 34′ in the bubble wire moves onto the propagation track 40 because of the lower reluctance offered by the track 40 at the vacant fence position. After transfer to the propagation track 40, the escaped bubble 34′ will proceed on the track to the annihilator 46. As in the circuit of FIG. 3, the bubbles immediately preceding the escaped bubble 34′ will advance one position in the bubble wire so that the bubble wire will be completely filled for the next cycle of operation. If the presence or absence of the input bubble 36 and the bubble 48 on the external track 40 are considered as binary variables X and Y respectively, then the presence or absence of the output bubble 38 represents the function $f = XY$, the AND function.

The spacing of the permalloy dots on each side of the position of the omitted permalloy dot may be selected to exert a slight repelling effect on bubbles within the channel so that no bubbles wander out of the channel onto the track 40 in the absence of an input bubble 46. However this feature is not essential because a bubble can only wander out of the channel when there is an absence of a bubble on track 40 and at such time a bubble is supposed to be expelled by an input bubble 36.

Figure 6:
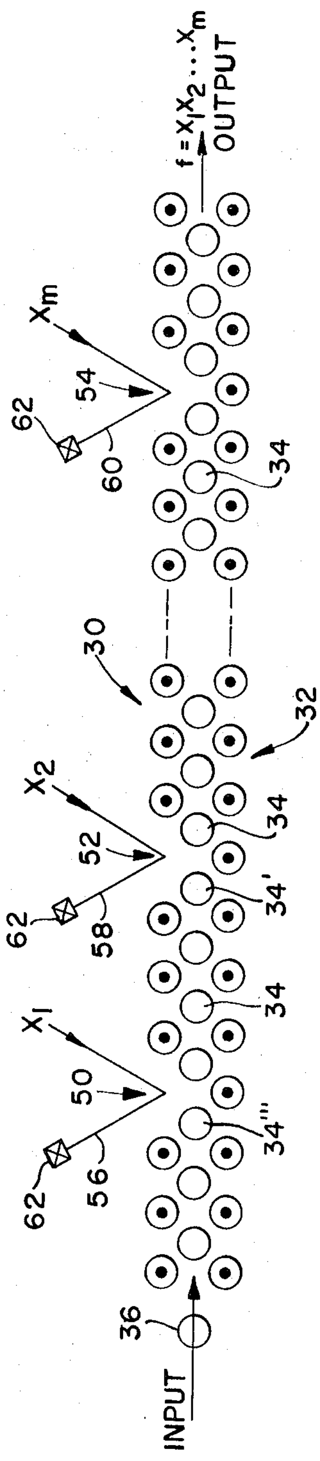
FIG. 6 is a schematic diagram of a modified bubble wire forming an $m$-input fast AND gate according to the invention.

More than one special fence position can be arranged along the same bubble wire. An arrangement following this principle is illustrated in FIG. 6. A long bubble wire is formed by bubble fences 30 and 32. The bubble wire is completely filled with bubbles 34 as in FIGS. 2–5. A number, $m$, of spaced special fence positions are formed along the length of bubble fence 32. Only three of these positions, 50, 52 and 54 are shown for ease of illustration. V-shaped external propagation tracks 56, 58 and 60 pass through the respective special fence positions 50, 52 and 54. Each propagation circuit has an annihilator 62 terminating its downstream end. The direction of propagation through the tracks 56, 58 and 60 is opposite that of the single track 40 shown in FIGS. 4 and 5, although the direction could be the same as that in FIGS. 4 and 5 if desired. The inputs to the propagation tracks 56, 58 and 60 are the variables $X_1$, $X_2$, $X_m$ and corresponding variables $X_3$ to $X_{m-1}$ associated with the external propagation tracks that are omitted from the drawing in FIG. 6. The binary variables $X_i$, where $i$ is an integer from 1 to $m$, are represented by the presences and absences of input bubbles on the corresponding external propagation tracks. The input bubble 36 in this example is considered to be always a binary 1, or present during each cycle of operation. Thus the input bubble 36 acts as a trigger bubble rather than a variable, although it could be a variable if desired. An output bubble is expelled from the bubble wire if and only if all m special fence positions are occupied simultanteously by a variable input bubble $X_i$. Thus, the output of the circuit of FIG. 6 is the function: $f = X_1X_2 \ldots X_m$, or an $m$-input AND function. If one of the variable inputs were the absence of a bubble, the bubble fence 30 would be broken at one point and the effect of the input bubble 36 would be to force the bubble nearest the vacant special fence position to move into that position and on to the corresponding external propagation track to an annihilator 62. Thus, the $i^{th}$ input to the gate is 1 when the $i^{th}$ special fence positioned is occupied by a bubble, and 0 when it is unoccupied. The wire is "whole" only when all $m$ inputs are 1. For example, if $X_1$ and $X_3$ through $X_m$ are 1, and $X_2$ is 0, the bubble wire will be "whole" except for the special fence position 52 which will be vacant. The simultaneous occurrence of an input bubble 36 will cause the nearest bubble 34′ among the bubbles 34 comprising the bubble wire to move into the special fence position 52 onto the propagation track 58 and ultimately to the annihilator 62. All of the bubbles preceding the bubble 34′ will move up one position. In this way, the bubble wire will reset itself before the next cycle; that is, all of the positions in the bubble wire will be filled by bubbles whether or not an output bubble is expelled from the wire. If all of the input variables are 1 except for, say, two of them, $X_1$ and $X_2$, fence positions 50 and 52 will both be vacant. In this case the input bubble 36 will cause the nearest bubble 34''' to move to the fence position 50. Because the chain reaction among the bubbles terminates at the point where one of the bubbles escapes from the bubble wire, the bubble 34' will remain in its position as shown in FIG. 6 without going to the fence position 52, even though that position is vacant.

The magnetic boundaries of the bubble wire are not restricted to fence post dot arrangements. For example, ferro-magnetic rails can be used to form strip domains and the rail can be broken at one or more points to form a special fence position.

The modified bubble wire can also be adapted to implement the NAND function by arranging external propagation circuits so that a normally present fence bubble is removed at a special fence position by the presence of a corresponding input 1. Thus, in order for the wire to be "whole" and the output bubble to be expelled, all of the input variables would have to be 0. In addition, the AND and NAND functions could be combined in the same bubble wire to form an output function having the general formula $X_1X_2 \ldots X_mY'_1Y'_2 \ldots Y'_m$, where prime indicates the complement or inverted variable.

The instantaneous operation and straightforward implementation of the circuit of FIG. 6 offer vast parallel logic potential. The speed, operation and reset feature of the bubble wire are independent of the number of input variables. A single trigger bubble will cause interrogation of the entire bubble wire no matter what its length. Moreover, the bubble wire is compatible with all known propagation circuits.

The invention may be embodied in other specific forms without departing from the spirit or central characteristics. For example, the special fence positions can be formed along both bubble fences of the wire and other means of controlling the discontinuities in the bubble fences, that is, for temporarily filling the vacant fence positions, are also possible. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A bubble logic circuit, comprising means for maintaining a plurality of adjacent magnetic bubbles in a string such that a magnetic impulse at one end is transferred through the string by means of a bubble-bubble chain reaction, means for generating said magnetic impulse at said one end of said string of bubbles, means for receiving a bubble ejected from the other end of said string due to said chain reaction, and control means for controlling the chain reaction along said string of bubbles in response to a logic input variable, said control means including a bubble propagation circuit adjacent to said string of bubbles and intersecting an area of interaction therewith for causing selective removal of an intermediate bubble from the string responsive to said logic input variable being in one state thereby terminating said chain reaction at the point of said removal and alternatively for propagating a magnetic bubble representing another state of said logic input variable into and out of the area of interaction to prevent said removal.

2. A bubble logic circuit, comprising a bubble wire including spaced elongated magnetic boundary means for containing a string of adjacent magnetic bubbles, means for applying a magnetic impulse to one end of said string of bubbles, means for receiving a bubble ejected from the other end of said string of bubbles in response to said magnetic impulse, and means forming at least one controlled discontinuity in at least one of said magnetic boundaries for breaking and reconstituting said magnetic boundary on command, whereby a bubble is ejected from said other end of said string when a magnetic impulse is applied to said one end if and only if said magnetic boundary has been reconstituted at the site of every controlled discontinuity.

3. The circuit of claim 2, wherein said means forming said controlled discontinuity includes a break in one of said boundary means through which a bubble can escape from said string and a bubble propagation circuit intersecting the location of said break for propagating an input bubble representing a logic input variable through said break location such that said break is temporarily sealed preventing escape of a bubble from said string when said input bubble is at said break location.

4. The circuit of claim 2, wherein said magnetic boundary includes spaced lines of spaced dots of ferromagnetic material providing stationary fence positions for corresponding magnetic bubbles.

5. The circuit of claim 4, wherein said dots are equally spaced in both of said lines except at the location of said controlled discontinuity where the spacing between said dots is increased to provide an opening called a special fence position in said magnetic boundary.

6. The circuit of claim 5, wherein said means for breaking and reconstituting said magnetic boundary includes a bubble propagation circuit intersecting said special fence position for propagating an input bubble representing a logic input variable through said special fence position to temporarily seal said opening.

7. The circuit of claim 6, wherein said propagation circuit has a bubble annihilator terminating the other end of said propagation circuit downstream of said special fence position.

8. A bubble logic gate, comprising a bubble wire including spaced elongated magnetic boundaries for containing a string of magnetic bubbles, means for supplying a magnetic impulse at one end of said string of bubbles, at least one of said magnetic boundaries being discontinuous at a plurality of special fence positions such that under predetermined conditions a bubble on said string can escape from the bubble wire via one of said special fence positions when said magnetic impulse is applied, a plurality of control circuits responsive to respective logic input variables associated respectively with said special fence positions each including means for carrying away an escaped bubble and alternatively for reconstituting said magnetic boundary at said special fence position to prevent a bubble from leaving said string, and means for receiving an output bubble ejected from the other end of said string of bubbles in response to both said magnetic impulse and reconstitution of said magnetic boundary at all of said special fence positions.

9. The gate of claim 8, wherein said magnetic boundaries are formed by spaced lines of spaced dots of ferromagnetic material providing stationary positions for respective fence bubbles.

10. The circuit of claim 9, wherein said dots are approximately equally spaced in corresponding fence positions along said boundaries except at said special fence positions where the spacing between dots is increased to provide an opening.

11. The circuit of claim 10, wherein said control circuits each include a bubble propagation circuit intersecting a respective special fence position for propagating a corresponding input bubble through said special position, such that when said special fence position is thus occupied by said input bubble, the magnetic boundary is reconstituted at that special fence position, and when said special fence position is unoccupied by said input bubble at the time of said magnetic impulse, a bubble on said string of bubbles is caused to move onto said propagation circuit at said special fence position, if it is the nearest unoccupied special fence position to the one end of said string.

12. The gate of claim 11, wherein bubble annihilators terminate at least some of said propagation paths downstream of said intersected special fence positions.

13. The circuit of claim 10, wherein said lines of dots are arranged relative to each other to provide relatively stable positions for the bubbles in said string.

14. The circuit of claim 10, wherein said lines of dots are arranged to define relatively stable positions for the bubbles in said string longitudinally between corresponding fence positions on said lines.

15. A bubble logic circuit, comprising means for maintaining a string of adjacent bubbles, means for generating a magnetic impulse at one end of said string of bubbles, means defining a normally available escape path for a bubble on said string at a predetermined intermediate location along said string, means for blocking said escape path in response to the condition of a logic variable, means for receiving a bubble ejected from the other end of said string due to a bubble-bubble chain reaction initiated by said magnetic impulse, if and only if said escape path is blocked, escape of a bubble on said string via said escape path terminating said chain reaction at said intermediate location when said escape path is available, said means for maintaining a string of bubbles including two-sided magnetic boundary means for applying repulsive force in a predetermined repetitive pattern from both sides of said string to restrain said bubbles in said string to a linear path alternating between high and low levels of force along said path so as to define relatively stable spaced positions for said bubbles along said path at locations corresponding to said low levels, and between adjacent locations corresponding to said low levels said boundary means providing on at least one side of said string a region of repulsive force sufficiently lower than said low level to form said escape path for a bubble.

16. A bubble logic circuit comprising means for maintaining a string of adjacent bubbles, means for generating a magnetic impulse at one end of said string of bubbles, means defining a normally available escape path for a bubble on said string, means for blocking said escape path in response to the condition of a logic variable, means for receiving a bubble ejected from the other end of said string due to a bubble-bubble chain reaction initiated by said magnetic impulse, if and only if said escape path is blocked, escape of a bubble on said string via said escape path terminating said chain reaction at said intermediate location when said escape path is available, said means for blocking said escape path including a bubble path for placing a blocking bubble representing said logic variable at the entrance to said escape path from said string, said blocking bubble being removed thereafter from said entrance via said escape path.

* * * * *